(12) United States Patent
Wolf et al.

(10) Patent No.: US 11,472,154 B2
(45) Date of Patent: Oct. 18, 2022

(54) SANDWICH COMPONENT, METHOD FOR PRODUCING A SANDWICH COMPONENT, AND USE OF A SANDWICH COMPONENT

(71) Applicant: NOLAX AG, Sempach Station (CH)

(72) Inventors: Thomas Wolf, Neudorf (CH); Patrick Steiner, Schattdorf (CH); Anton Brandmair, Traunstein (DE); Philipp Hug, Emmenbrücke (CH); Thomas Frey, Sursee (CH)

(73) Assignee: NOLAX AG, Sempach Station (CH)

( * ) Notice: Subject to any disclaimer, the term of this patent is extended or adjusted under 35 U.S.C. 154(b) by 794 days.

(21) Appl. No.: 16/317,968

(22) PCT Filed: Jul. 4, 2017

(86) PCT No.: PCT/EP2017/066646
§ 371 (c)(1),
(2) Date: Jan. 15, 2019

(87) PCT Pub. No.: WO2018/019524
PCT Pub. Date: Feb. 1, 2018

(65) Prior Publication Data
US 2019/0232602 A1   Aug. 1, 2019

(30) Foreign Application Priority Data
Jul. 25, 2016   (EP) ..................... 16181095

(51) Int. Cl.
*B32B 3/26*   (2006.01)
*B32B 7/12*   (2006.01)
(Continued)

(52) U.S. Cl.
CPC ............... *B32B 3/266* (2013.01); *B32B 3/06* (2013.01); *B32B 3/08* (2013.01); *B32B 3/12* (2013.01);
(Continued)

(58) Field of Classification Search
CPC ......... B32B 15/04; B32B 15/20; B32B 21/04; B32B 2250/40; B32B 2262/101;
(Continued)

(56) References Cited

U.S. PATENT DOCUMENTS 3,305,996 A * 2/1967 Shapiro ..................... F16B 5/01
428/116
3,771,272 A * 11/1973 Mihaly ..................... F16B 5/01
52/366

(Continued)

FOREIGN PATENT DOCUMENTS

EP        1369599 A1 * 12/2003 ............ F16B 13/141
EP        1 958 975 A1    8/2008
(Continued)

OTHER PUBLICATIONS

International Search Report Corresponding to PCT/EP2017/066646 dated Oct. 9, 2017.
(Continued)

*Primary Examiner* — Philip C Tucker
*Assistant Examiner* — Brian R Slawski
(74) *Attorney, Agent, or Firm* — Finch & Maloney PLLC (57) ABSTRACT

A sandwich component comprising: (i) a first main surface with a first cover layer and a second main surface with a second cover layer, the first cover layer and/or second cover layer having an opening, weakening, or marking in a lateral region and/or is provided with the same, (ii) at least one intermediate layer positioned between the first and second cover layers, and (iii) a polymer composition which is arranged between the first and the second cover layers substantially within the intermediate layer and/or in the region of the opening, weakening, or marking. A mechanical connection mechanism is fixed, or can be fixed, directly in the polymer composition through the first cover layer and/or
(Continued)

the second cover layer and/or in the lateral region in the region of the opening, weakening, or marking so as to pass through the first cover layer and/or the second cover layer and/or the lateral region.

4 Claims, 5 Drawing Sheets

(51) Int. Cl.

| | | |
|---|---|---|
| *B32B 3/06* | (2006.01) | |
| *B32B 3/12* | (2006.01) | |
| *F16B 5/01* | (2006.01) | |
| *F16B 11/00* | (2006.01) | |
| *B32B 5/18* | (2006.01) | |
| *B32B 21/04* | (2006.01) | |
| *B32B 15/20* | (2006.01) | |
| *B32B 15/04* | (2006.01) | |
| *B32B 3/08* | (2006.01) | |
| *B32B 9/00* | (2006.01) | |
| *B32B 27/06* | (2006.01) | |
| *B32B 7/08* | (2019.01) | |
| *B32B 37/12* | (2006.01) | |
| *B29C 65/56* | (2006.01) | |
| *B29C 65/72* | (2006.01) | |
| *B29C 65/54* | (2006.01) | |
| *B29C 65/60* | (2006.01) | |
| *B29C 65/48* | (2006.01) | |

(52) U.S. Cl.
CPC .................. *B32B 5/18* (2013.01); *B32B 7/08* (2013.01); *B32B 7/12* (2013.01); *B32B 9/002* (2013.01); *B32B 15/04* (2013.01); *B32B 15/20* (2013.01); *B32B 21/04* (2013.01); *B32B 27/06* (2013.01); *B32B 37/12* (2013.01); *F16B 5/01* (2013.01); *F16B 11/006* (2013.01); *B29C 65/483* (2013.01); *B29C 65/542* (2013.01); *B29C 65/562* (2013.01); *B29C 65/601* (2013.01); *B29C 65/72* (2013.01); *B32B 2037/1253* (2013.01); *B32B 2250/40* (2013.01); *B32B 2262/101* (2013.01); *B32B 2262/106* (2013.01); *B32B 2419/00* (2013.01)

(58) Field of Classification Search
CPC .......... B32B 2262/106; B32B 2419/00; B32B 27/06; B32B 3/06; B32B 3/08; B32B 3/12; B32B 3/266; B32B 37/12; B32B 5/18; B32B 7/08; B32B 7/12; B32B 9/002; B32B 2037/1253; F16B 11/006; F16B 5/01; B29C 65/48; B29C 65/483; B29C 65/542; B29C 65/56; B29C 65/561; B29C 65/562; B29C 65/564; B29C 65/60; B29C 65/601; B29C 65/72
USPC .... 156/60, 66, 91, 92, 153, 242, 245, 331.7; 264/259, 267; 428/116, 117, 118
See application file for complete search history.

(56) References Cited

U.S. PATENT DOCUMENTS

| | | | | |
|---|---|---|---|---|
| 4,800,643 | A | * | 1/1989 | Higgins ................ F16B 13/141 264/273 |
| 6,656,299 | B1 | * | 12/2003 | Grosskrueger ......... B29C 73/30 156/92 |
| 2010/0108260 | A1 | | 5/2010 | Rasche et al. |
| 2011/0220267 | A1 | * | 9/2011 | Blancaneaux ............ F16B 5/01 156/247 |
| 2014/0212241 | A1 | * | 7/2014 | Burd ........................ F16B 5/01 411/366.1 |
| 2014/0317891 | A1 | | 10/2014 | Steiner et al. |
| 2015/0096678 | A1 | | 4/2015 | Siboni et al. |
| 2016/0280976 | A1 | | 9/2016 | Buser |

FOREIGN PATENT DOCUMENTS

| | | | |
|---|---|---|---|
| EP | 2 589 478 | A1 | 5/2013 |
| EP | 2 871 194 | A1 | 5/2015 |
| GB | 973 559 | | 10/1964 |
| GB | 973559 | A * | 10/1964 ............ F16B 37/122 |
| WO | 2014/032765 | A1 | 3/2014 |

OTHER PUBLICATIONS

Written Opinion Corresponding to PCT/EP2017/066646 dated Oct. 9, 2017.

* cited by examiner

SANDWICH COMPONENT, METHOD FOR PRODUCING A SANDWICH COMPONENT, AND USE OF A SANDWICH COMPONENT

This application is a National Stage completion of PCT/EP2017/066646 filed Jul. 4, 2017, which claims priority from European patent application serial no. 16181095.7 filed Jul. 25, 2016.

FIELD OF THE INVENTION

The invention relates to a sandwich component, processes for producing a sandwich component, a kit and a method for joining a sandwich component as per the independent claims.

BACKGROUND OF THE INVENTION

As a construction method, the sandwich construction is a form of lightweight construction in which the components consist of load-bearing strong covering layers which are kept at a spacing by a relatively soft, usually light, core material (intermediate layer). These parts combine a low weight with a high stiffness in respect of bending and denting. In building construction, they are calculated according to the linear sandwich theory. The core can consist of paper honeycombs, metal honeycombs, in particular aluminum honeycombs, foams, for example rigid foam, mineral wool or balsa wood. It transfers shear forces which occur and supports the covering layers. The thermal and acoustic insulating property of the very light core materials is often also utilized. As covering layers, use is made of, inter alia, sheet metal, metals such as aluminum, chromium-nickel/galvanized steel, fiber composites; polymers such as polypropylene (PP), polyvinyl chloride (PVC), polysulfone (PS), polyurethane (PUR); fiber-reinforced polymers such as glass fiber-reinforced plastic (GFP), aramid, carbon fiber-reinforced plastic (CFP); wood materials such as (ply)wood, high-density fiberboards (HDF); mineral materials, in particular glass; stone. Force introduction points are often provided with reinforcements.

In the case of commercial solutions with reinforcements, for example inserts which are introduced into the sandwich structure or onserts which are applied onto the sandwich structure, an in-principle distinction has to be made in respect of force transmission between force transmission from the mechanical connecting means to the insert or onsert and force transmission from the insert or onsert to the actual component.

In GB 973 559 A, an insert is positioned in a sandwich structure and a liquid resin is subsequently applied and after curing fixes the insert. A significant disadvantage of this method is that the insert and/or the hole in the sandwich structure has to be configured in such a way that the insert can be held in the planned position until the resin has cured. Furthermore, a high consumption of materials is associated with this method due to the use of an insert and a resin.

Furthermore, commercial pointwise force introductions into lightweight building materials, in particular blind fastenings in sandwich panels or sandwich component ends, have the disadvantage that the insert or onsert for force introductions has to be introduced manually since automation is complicated. This leads to high process costs and low process reliability. A further disadvantage is that the product design and the flexibility of the components are greatly limited at the manufacturer's end by standardized connecting means.

Another disadvantage of known solutions is that the possible loading values are limited, particularly in the case of sandwich components, since force introduction often cannot be dissipated optimally over the area of the two supporting covering layers.

SUMMARY OF THE INVENTION

It is therefore an object of the invention to overcome the disadvantages of the prior art. In particular, it is an object of the invention to provide a sandwich component which allows optimized force introduction into and/or force conduction away from the supporting covering layers. Furthermore, it is a particular object of the invention to provide an automated process and/or a situation-related introduction or application of a force-introducing and/or force-removing element into a sandwich component.

These objects are achieved by the features of the independent claims.

The invention relates to a sandwich component which comprises a first main area having a first covering layer and a second main area having a second covering layer. These are in particular a first covering plate and a second covering plate. The first covering layer and/or the second covering layer has an opening, weakening or marking, and/or an opening, weakening or marking is provided in the side region, in particular in a cover. The sandwich component has at least one intermediate layer which is positioned between the first covering layer and the second covering layer. An in particular injected and preferably crosslinked polymer composition is arranged to form an insert in the intermediate layer, which composition is arranged between the first covering layer and the second covering layer and essentially within the intermediate layer and/or in the region of the opening, weakening or marking. Here, a mechanical connecting means protruding through and from the first covering layer and/or the second covering layer and/or in the side region, in particular the cover, in the region of the opening, weakening or marking, in particular through and from the first covering layer and/or the second covering layer and/or the side region, in particular the cover, is fixed or is able to be fixed directly in the polymer composition.

For the purposes of the present invention, the main areas of the sandwich component are the surface sides which are not formed by the intermediate layer. The main areas thus correspond to the surfaces of the covering layers which face away from the intermediate layer. The side region or side regions of the sandwich component is/are the region or regions which are formed by the covering layers and the intermediate layer.

For the purposes of the present invention, a cover is preferably a plate, a rail or a sandwich component. The cover is preferably arranged or able to be arranged on a side of the sandwich component of the invention in such a way that the opening, weakening or marking is arranged in a region of the intermediate layer exposed at the side.

For the purposes of the present invention, "directly" means that the connecting means is in direct contact with the polymer composition and is not fixable or fixed via, for example, a separate insert in the polymer composition.

Here and in the following, "fixed" means that the connecting means is introduced into or applied to the polymer composition. Here and in the following, "fixable" or "able to be fixed" means that the connecting means can be introduced into or applied to the polymer composition.

In this way, a sandwich component which can accommodate various mechanical connections, for example various types of screw or types of thread is provided. Here, the insert does not have to be matched to a defined screw or mechanical connecting means as in the case of commercial metal or plastic inserts. The physical properties of the force introduction point and thus of the component can be optimized by adaptation of the properties of the polymer composition and insert geometry. Furthermore, the hardness and elasticity properties within a connection point can be set so as to achieve optimized force introduction into the component structures. This is particularly advantageous in the case of dynamic loads. Furthermore, it is advantageous that increased screwing-in and screwing-out resistances (torques) compared to conventional fastenings in metal and plastic inserts can be achieved as a function of the polymer composition. Elimination of the metal or plastic insert in the sandwich component of the invention enables the number of interfaces and thus the risk of faults in respect of adhesion and/or corrosion to be reduced.

The connecting means can be selected from the group consisting of screw, threaded rod, clip, bolt, bushings, sheaths, spacer, pins, nail, hook, clamp, spring, rivets, peg, profiles, brackets, hinges, magnets.

The connecting means can be prepositioned before introduction of the polymer composition and have the polymer composition sprayed onto it or injected around it or be introduced into or applied to the polymer composition after the latter has solidified.

The polymer composition can be selected from the formulations disclosed in EP 2 589 478 A1. These are incorporated by reference. The polymer composition is, in particular, an adhesive having the following properties. The adhesive is preferably a rapid-curing two-component adhesive based on polyurea as described in EP 1 958 975 B1 or EP 2 871 194. These are incorporated by reference.

The polymer composition preferably comprises an isocyanate-containing component A and an amine-containing component B. The component A contains an isocyanate-terminated prepolymer having an isocyanate functionality of $\geq 1.7$, preferably $1.7<f_{NCO}<3$, particularly preferably in the range from 2 to 3. The component B contains at least one diamine and/or polyamine, preferably a polyetherdiamine and/or polyetherpolyamine. The stoichiometric ratio of isocyanate groups in component A to amine groups in component B is from 0.5 to 1.2, particularly preferably 1.

The polymer composition particularly preferably comprises a first component A and a second component B. The component A contains a monomeric polyisocyanate, in particular monomeric diisocyanate, and an isocyanate-terminated prepolymer and/or a prepolymer mixture having an isocyanate functionality of $\geq 1.7$, preferably in the range of $1.7<f_{NCO}<3$, particularly preferably in the range of $2<f_{NCO}<3$. The second component B contains a diamine and/or polyamine, in particular a polyetherdiamine and/or a polyetherpolyamine; and a trimerization catalyst. The stoichiometric ratio of isocyanate groups in the first component A to isocyanate-reactive hydrogen atoms present in the composition in the second component B is from 7.5 to 25, preferably from 30 to 20, particularly preferably 15. A two-component polymer composition in which, in a first step, a second prepolymer is formed by reaction of the monomeric polyisocyanate (in particular diisocyanate) present in excess with the polyamine is thus used. This reaction is strongly exothermic. At the same time, crosslinking of the isocyanate-terminated prepolymer of the component A occurs by means of amines provided in the component B. In the further course of the reaction, trimerization of the isocyanate groups present predominantly occurs in the presence of appropriate catalysts, in particular potassium octoate. Thus, the polymer composition has both a higher tensile strength and heat resistance compared to conventional polyurethane and polyurea adhesives and also a higher impact toughness than other high-strength adhesives such as epoxy resins.

In principle, other two-component adhesives which are based on polyurethane, epoxide or acrylate and cure to form thermosets can also be used. The adhesive is described as liquid in the correct application state at a viscosity of <10000 mPas, preferably <300 mPas, ideally <100 mPas (measured in the mixing head of the applicator at 35° C.-65° C., preferably 50° C., and a pressure of 70-140 bar, preferably 100 bar). This mixing viscosity can be optimized further by selection of the temperature of the components.

In this context, curing refers to the chemical solidification of the adhesive by polymerization, polycondensation and polyaddition. A rapidly setting, in particular rapidly chemically setting, structural load-bearing polymer composition is provided in this way.

The opening can be selected from the group consisting of slot, hole, in particular circular hole. These can be introduced mechanically by drilling, milling, stamping, slitting, perforating, laser cutting, grinding, cutting, chemically or thermally. One opening, a plurality of openings, a plurality of comparatively small openings, which are round, angular or slot-like, can be provided here. Free shapes are likewise possible. In this way, the polymer composition can be introduced particularly advantageously into the intermediate layer.

The choice of the opening as a noncircular opening, for example as a slot, provides a connection point which ensures positive locking as anti-rotation safeguard for the solidified polymer composition. Greater forces can be withstood in this way.

Concealed assembly can be made possible when the opening is selected as small, narrow openings.

The sandwich component can be a honeycomb plate, preferably a metal honeycomb plate, particularly preferably an aluminum honeycomb plate, a plastic core honeycomb plate, a wood material honeycomb plate, a foam core plate or a fiber core plate.

The covering layers can preferably be selected from among metals such as aluminum, chromium-nickel/galvanized steel; polymers such as polypropylene (PP), polyvinyl chloride (PVC), polysulfone (PS), polyurethane (PUR); fiber-reinforced plastics such as glass fiber-reinforced plastic (GFP), aramid, carbon fiber-reinforced plastic (CFP); wood materials such as plywood, high-density fiberboards (HDF); mineral materials, in particular glass; stone.

The intermediate layer can preferably be selected from among honeycombs, ribs, webs, for example cardboard, plastic, metal, fiber composite, wood material, foam material, fiber material and loose material made up of polymers such as polyvinyl chloride (PVC), polyethylene terephthalate (PET), polymethacrylimide (PMI), expanded polystyrene (EPS), extruded polystyrene foam (XPS), recycled material, wood materials such as balsa wood, soft fibers, turnings, composite material, tubular swarf, lightweight solid wood board; glass; stone; metals such as aluminum.

The polymer composition can be configured so that the polymer composition forms an undercut. The undercut here is preferably located on the first covering layer and/or the second covering layer, particularly preferably at the surface of the first covering layer and/or the second covering layer which faces the intermediate layer. In this way, a positive locking join between the polymer composition and the first and/or second covering layer can be formed, so that particularly strong forces can be introduced and conducted away to the covering layers.

Furthermore, the polymer composition can be configured so that it forms a material-to-material, i.e. adhesive, and/or positive and/or force locking join. The adhesive join is preferably formed between the polymer composition and the intermediate layer and/or the first covering layer and/or the second covering layer. As a result of this configuration, too, particularly strong forces are introduced and conducted away to the covering layers.

A further aspect of the invention provides a process for producing a sandwich component, in particular as described above, having at least one insert and/or onsert composed of a crosslinkable polymer composition. The process comprises the step of provision of a sandwich component comprising a first covering layer and a second covering layer, in particular a first outer layer and a second outer layer. The first covering layer and/or the second covering layer and/or a cover on a side of the sandwich component has an opening, weakening or marking. The sandwich component has at least one intermediate layer positioned between the first covering layer and the second covering layer.

The process further comprises the steps of introduction, in particular injection, of a crosslinkable polymer composition at the position of the marking or the weakening or through the opening in the first covering layer and/or the second covering layer and/or the cover into the intermediate layer and solidification of the polymer composition between the covering layers so that a mechanical connecting means protruding through and from the first covering layer and/or the second covering layer and/or the cover in the region of the opening, weakening or marking, in particular through and from the first and/or second covering layer and/or the cover, can be fixed directly in the polymer composition. This provides a process by means of which insert and onsert solutions for lightweight structures, in particular sandwich components, can be achieved in a fast process. A predefined insert which, for example, is adhesively bonded in is not required here. Furthermore, damage to the covering layer(s) is minimized and the force introduction point is not tied to the insert or onsert diameter unlike conventional solutions. The process is cheaper and increases the process reliability. Standardized additional parts do not have to be provided.

Preferred polymer compositions are those which have been described above.

The crosslinkable polymer composition can be an adhesive, in particular a two-component adhesive. In this way, a polymer composition which after solidification is structural load-bearing and in particular does not expand is introduced. A high introduction of force is, for example, achieved via the thread of the mechanical connecting means. As a result of the exothermal properties of the polymer composition, the intermediate layer and/or existing adhesive layers of the sandwich component can be melted in regions during curing of the polymer composition. This improves the anchoring of the polymer composition; installation of fastening elements made of plastic, for example plastic screws, is improved. Preferred polymer compositions are as described above.

The crosslinkable polymer composition can have a pot life in the range from 1 to 15 seconds, preferably from 2 to 10 seconds, particularly preferably from 3 to 7 seconds. As a result, the polymer composition does not flow away at the target position and accordingly no positioning aids, for example mesh sleeves, are necessary for positioning the polymer composition. Furthermore, the sandwich component can be processed further promptly since after a very short time the polymer composition has the necessary strength to produce, for example, a load-bearing join to a further component by means of the connecting means.

According to DIN EN 923:1998-05, the pot life is the period of time during which a multicomponent adhesive can be processed after mixing. The pot life was determined by the "Method 3: Determination by manual application" of DIN EN 14022:2010 (German version). Of course, the short reaction time of the system has to be taken into account here.

The process can further comprise the step of application or introduction of a connecting means to or into the polymer composition before or after solidification of the polymer composition. "Into the polymer composition" means that the connecting means can be prepositioned at the target position, so that the polymer composition is injected around the connecting means. As an alternative, the connecting means is introduced into the solidified polymer composition, for example a screw is screwed in.

The connecting means can be selected from the group consisting of screw, threaded rod, clip, bolt, bushings, sheaths, spacer, pins, nail, hook, clamp, spring, rivets, peg, profiles, brackets, hinges, magnets.

The invention further provides a kit for producing a sandwich component, in particular as indicated above, having at least one insert and/or onsert composed of a preferably crosslinked polymer composition, which comprises a crosslinkable, in particular two-component, polymer composition and use instructions for carrying out a process as indicated above.

A further aspect of the invention provides a method for joining a sandwich component as indicated above to a further element, which comprises the step of application or introduction of a connecting means directly onto or into the polymer composition before or after solidification of the polymer composition.

The connecting means can be selected from the group consisting of screw, threaded rod, clip, bolt, bushings, sheaths, spacer, pins, nail, hook, clamp, spring, rivets, peg, profiles, brackets, hinges, magnets.

The invention further provides for the use of a sandwich component as described above in the field of road, in particular commercial vehicles, passenger cars, Formula 1, motorhomes, two-/three-wheelers, temporary road surfacings; rail, in particular train, tram, cable cars; air travel, in particular space travel, aircraft, drones, satellites; marine, in particular yacht and superyacht, river ships, cargo ships, cruise ships, oil platforms, offshore installations, underwater; building, in particular exterior walls and roofs, floors, bridges, elevator, escalators, mobile housing; interior finishing, in particular furniture, ceilings, walls, floors, shop construction, exhibition construction, stage construction, display, partitioning walls, doors; sport, in particular winter sport and water sport; logistics, in particular containers, tanks, pallets, packaging; energy, in particular wind energy installations, solar installations; machine construction, in particular stamping tools, linings, moving parts; medicine, in particular tooth implants, implants, fixings; military technology, in particular rockets.

The invention will be explained in more detail below with the aid of illustrative embodiments.

DETAILED DESCRIPTION OF THE PREFERRED EMBODIMENTS

FIGS. 1A-1H show sandwich components 1 according to the invention having a first covering layer 11 and a second covering layer 12 which are separated by an intermediate layer 13. For the descriptions given below, an opening 31 was drilled through the first covering layer 11 and material of the intermediate layer 13 was removed. A crosslinked polymer composition 21 is present as insert in the region of an opening 31 and in the region of the intermediate layer 13.

Figure 1A:
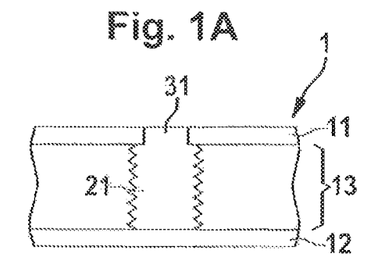
FIGS. 1A-1H: Sectional sketches of sandwich components according to the invention with polymer compositions as inserts.

In FIG. 1A, the polymer composition 21 is in contact with the second covering layer 12. A connecting means can be applied to or introduced into the polymer composition 21, for example a screw can be screwed in.

Figure 1B:
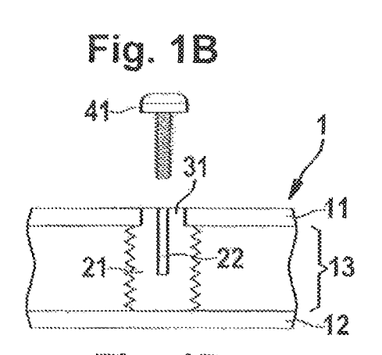

In FIG. 1B, the polymer composition 21 has a recess 22 which is configured for introduction of a connecting means, here a screw 41.

Figure 1C:
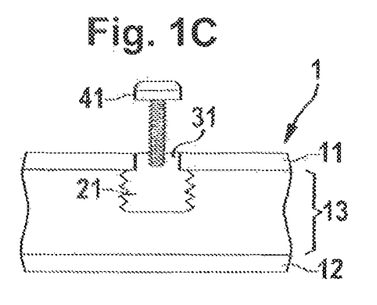

FIG. 1C shows a polymer composition 21 as insert which is not in contact with the second covering layer 12. Here, a screw 41 has been introduced into the polymer composition 21.

Figure 1D:
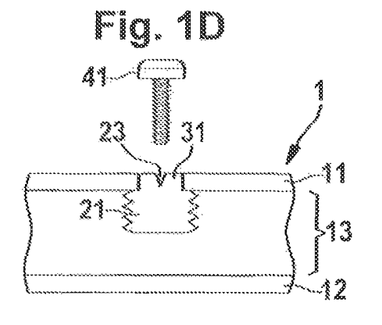

FIG. 1D shows a polymer composition 21 as insert which is not in contact with the second covering layer 12 and has a positioning aid 23, here a notch, in the polymer composition in the region of the opening 31. By means of the positioning aid 31, a screw 41 is positioned and introduced at the central region of the polymer composition.

Figure 1E:
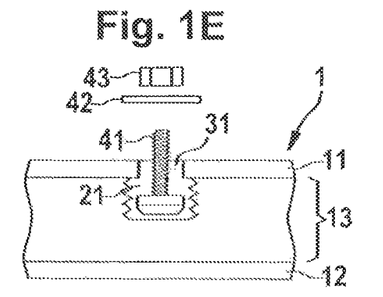

FIG. 1E shows a polymer composition 21 as insert which is not in contact with the second covering layer 12 and a screw 41 which has been prepositioned in the polymer composition, with the thread of the screw protruding from the sandwich component through an opening 31. The screw 41 was positioned in the region of the intermediate layer 13 before introduction of the polymer composition 21 and the polymer composition 21 was subsequently injected around the screw. A washer 42 and a nut 43 can be installed on the exposed thread of the screw 41.

FIGS. 1C, 1D and 1E are particularly advantageous for decoupling of vibrations and acoustic and/or thermal decouplings. Furthermore, forces can be dissipated only onto one of the covering layers in a directed manner.

Figure 1F:
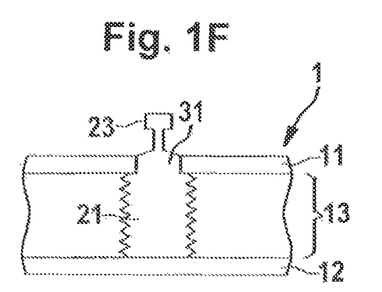

In FIG. 1F, the polymer composition 21 is in contact with the second covering layer 12. The polymer composition 21 projects through the opening 31 out of the first covering layer 11 and has a positioning element or fixing element 23. A further element which is configured so as to form a positive connection with the positioning element or fixing element 23 can be installed on the positioning element or fixing element 23.

Positioning elements or fixing elements can be brackets, angles, bolts, clips, sheaths, internal threads, screws, pins, recesses, projections, rails, barbs or rivets.

Figure 1G:
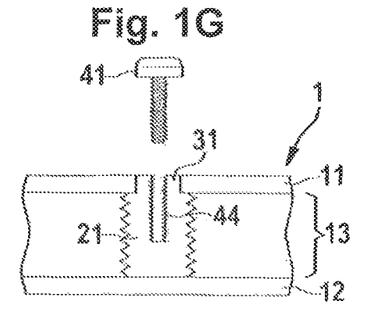

In FIG. 1G, the polymer composition 21 has an internal thread 44 which is configured for screwing-in of a screw 41.

Figure 1H:
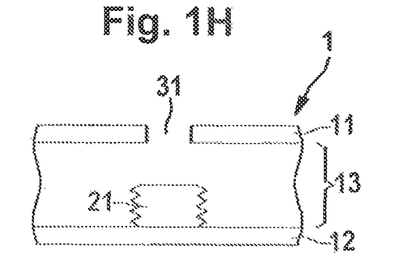

FIG. 1H shows a sandwich component 1 in which the polymer composition 21 is in contact with the second covering layer 12 but not with the first covering layer 11. This is particularly advantageous for the decoupling of vibrations and acoustic and/or thermal decouplings. Furthermore, forces can be dissipated only onto one of the covering layers in a directed manner.

Figure 2A:
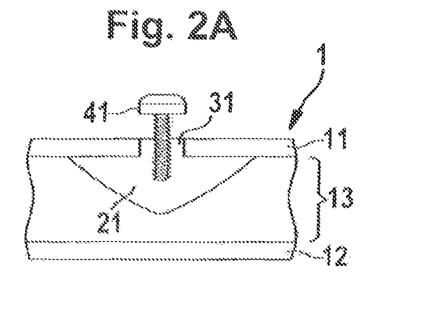
FIGS. 2A-2C: Sectional sketches of sandwich components with polymer compositions as inserts.
Figure 2B:
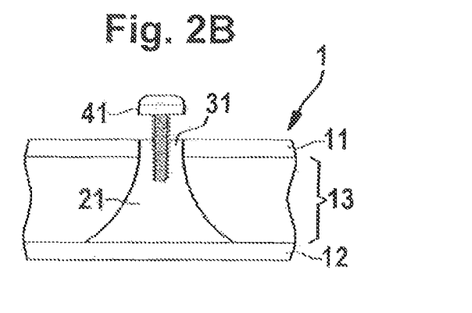
Figure 2C:
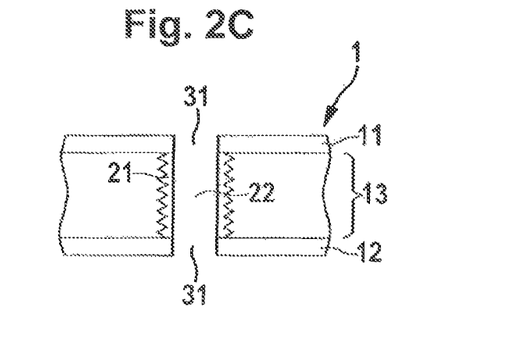

FIGS. 2A-2C show further sandwich components 1 according to the invention having a first covering layer 11 and a second covering layer 12, with an intermediate layer 13 being positioned between the two covering layers 11, 12. In FIG. 2A, the first covering layer 11 has an opening 31. Material of the intermediate layer is removed by special undercut milling so as to predetermine the shape of the polymer composition 21 introduced afterward into the intermediate layer. A crosslinkable polymer composition 21 is injected through the opening 31 into a region of the intermediate layer 13. The polymer composition 21 forms an undercut and is in regions in contact with the surface of the first covering layer 11 facing the intermediate layer 13. An undercut is in this way formed on the first covering layer 11. A screw 41 is positioned in the crosslinked polymer composition 21. This ensures a high introduction of force. FIG. 2A is particularly advantageous for the decoupling of vibrations and acoustic and/or thermal decouplings. Furthermore, forces directed only onto one of the covering layers can be conducted away.

In FIG. 2B, the polymer composition 21 is in contact with the second covering layer 12. Here, the shape of the polymer composition 21 in the solidified state is selected so that improved introduction of force is ensured. In the contact region between the polymer composition 21 and the second covering layer 12, the polymer composition 21 is widened in comparison with the region of the opening 31, so that a high conduction of force onto the covering layer 12 is possible.

In FIG. 2C, the polymer composition 21 is in contact with the first covering layer 11 and the second covering layer 12. There is an opening 31 in the first covering layer 11. An opening 31' is present in the second covering layer 12. The polymer composition 21 serves as spacer between the two covering layers 11, 12 in the case of local pressure perpendicular to the plate. The polymer composition 21 has a cut-out 22 which extends from the opening 31 to the opening 31'. As a result, a connecting means, for example a pin, can be inserted through the openings 31, 31' and positioned. In this way, force-introducing joins can be produced via the first covering layer 11 and the second covering layer 12.

Figure 3A:
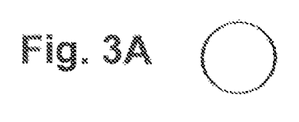
FIGS. 3A-3E: Variants of possible openings in the sandwich component according to the invention.
Figure 3B:
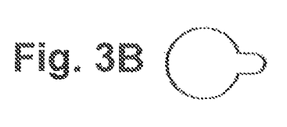
Figure 3C:
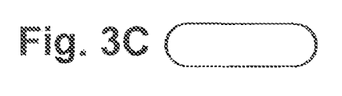
Figure 3D:
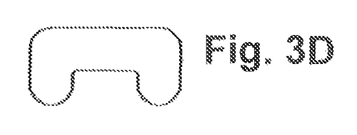
Figure 3E:
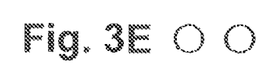

FIGS. 3A-3E snow openings in a sandwich component according to the invention (cf. 31 in FIGS. 1A-1H and 2A-2C). The opening can be circular (FIG. 3A), circular with at least one notch (FIG. 38) or configured as straight slot (FIG. 3C), as slot curved on one side or slot curved on two sides (FIG. 3D). The opening car, likewise have a plurality of, preferably two, circular openings for introduction of the polymer composition of the component according to the invention (FIG. 3E). In FIGS. 36 to 3E, the openings provide an anti-rotation safeguard for the polymer composition (cf. 21 in FIGS. 1A-1H and 2A-2C) in the sandwich component (cf. 1 in FIGS. 1A-1H and 2A-2C) when the polymer composition is arranged in the region of the opening.

Figure 4A:
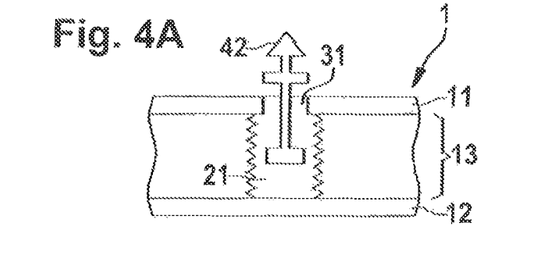
FIGS. 4A-4C: Sectional sketches of sandwich components according to the invention with polymer composition as inserts and connecting means introduced into these.
Figure 4B:
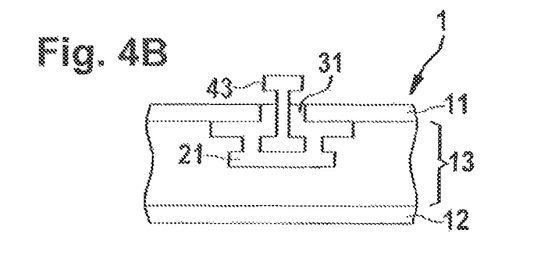
Figure 4C:
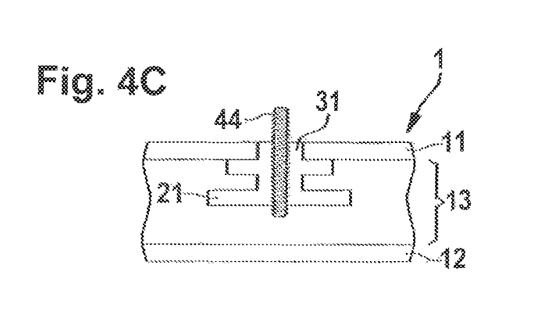

FIGS. 4A-4C show sandwich components according to the invention having a polymer composition as insert and connecting means introduced into this (FIGS. 4A to 4C).

In FIG. 4A, the polymer composition 21 is in contact with the second covering layer 12. The polymer composition 21 is configured as insert into which a hook 42 as connecting means has been introduced directly.

In FIG. 4E, the polymer composition extends into the intermediate layer 13 and forms undercuts on the first covering layer 11. A profile 43 as connecting means has been inserted directly into the polymer composition configured as insert.

In FIG. 4C, the polymer composition likewise extends into the intermediate layer 13 and forms undercuts on the first covering layer 11. A threaded rod 44 has been introduced directly into the polymer composition 21.

Figure 5A:
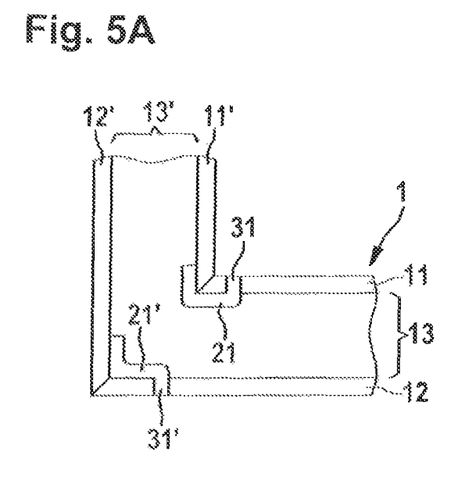
FIGS. 5A-5D: Sectional sketches of sandwich components according to the invention as corner connections (FIG. 5A, 5B), T-connections (FIG. 5C) or end connections (FIG. 5D)
Figure 5B:
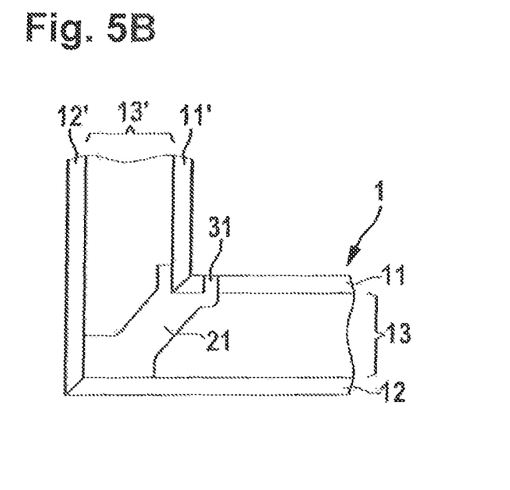
Figure 5C:
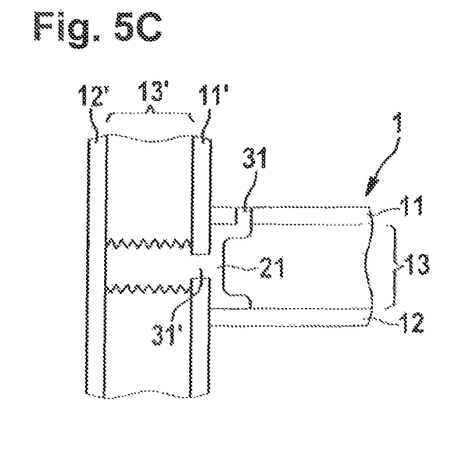
Figure 5D:
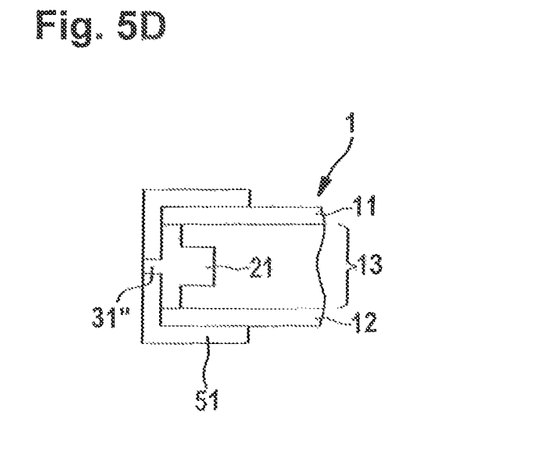

FIGS. 5A-5D show sandwich components according to the invention having corner joins (FIGS. 5A, 5B), T-joins (FIG. 5C) or end joins (FIG. 5D).

FIG. 5A shows a sandwich component 1 having a first sandwich plate and a second sandwich plate. The first sandwich plate is formed by a first covering layer 11 and a second covering layer 12, with the covering layers 11 and 12 being separated by an intermediate layer 13. The first covering layer 11 has an opening 31. The second covering layer 12 has an opening 31'. The second sandwich plate is formed by a first covering layer 11' and a second covering layer 12', with the covering layers 11' and 12' being separated by an intermediate layer 13'. The first sandwich plate and the second sandwich plate form a corner join, with the first covering layer 11 being in contact with the first covering layer 11', the second covering layer 12 being in contact with the second covering layer 12' and the intermediate layer 13 being in contact with the intermediate layer 13'.

A first polymer composition 21 has been injected through the opening 31 into a region of the intermediate layer 13 and a region of the intermediate layer 13', with the polymer composition 21 being in contact with the surfaces of the covering layers 11 and 11' which face the intermediate layers 13 and 13'. Likewise, a second polymer composition 21' has been injected through the opening 31' into a region of the intermediate layer 13 and a region of the intermediate layer 13', with the polymer composition 21 being in contact with the surfaces of the covering layers 12 and 12' which face the intermediate layers 13 and 13'. The first polymer composition 21 and the second polymer composition 21' preferably have the same chemical composition. A corner join between two sandwich plates is in this way produced in a particularly simple way. The advantages described above for sandwich components likewise apply here.

FIG. 5B differs from FIG. 5A in that a single opening 31 has been formed in the first covering layer 11, through which opening a polymer composition 21 is injected. Here, the polymer composition 21 is in contact with the surfaces of the covering layers 11, 11', 12, 12' which face the intermediate layers 13 and 13'. The polymer composition 21 forms a strut between the covering layers in the region of the corner join. A corner join between two sandwich plates is in this way produced in a particularly simple way. The advantages described above for sandwich components likewise apply here.

FIG. 5C shows a T-join between a first sandwich plate and a second sandwich plate. The first sandwich plate is configured as described for FIG. 5B. The second sandwich plate has an opening 31' in the first covering layer 11'. The first sandwich plate and the second sandwich plate are arranged at an angle of essentially 90°. The opening 31' of the second sandwich plate is arranged in the region of the intermediate layer 13 on the first sandwich plate. Other angles are likewise possible for particular applications. A polymer composition 21 is injected through the opening 31 into a region of the intermediate layer 13 and into a region 13'. Here, part of the polymer composition 21 goes through the opening 31' into the intermediate layer 13'. The polymer composition 21 joins the covering layers 11, 12, 11' and 12'. A T-join between two sandwich plates is in this way produced in a simple way. The advantages described above for sandwich components likewise apply here.

FIG. 5D shows a sandwich component 1 having a first covering layer 11 and a second covering layer 12, with the covering layers 11, 12 being separated by an intermediate layer 13. A cover is arranged as rail 51 in an end region of the covering layers 11 and 12 and is in contact with the surfaces of the covering layers 11 and 12 which face away from the intermediate layer 13 and with the region of the intermediate layer 13 which is not in contact with the covering layers 11, 12. The rail 51 has an opening 31" which is arranged in the abovementioned region of the intermediate layer 13. A polymer composition 21 has been injected through the opening 31" into the end region of the intermediate layer 13. The polymer composition is in contact with surfaces of the covering layers 11 and 12 which face the intermediate layer 13.

Figure 6:
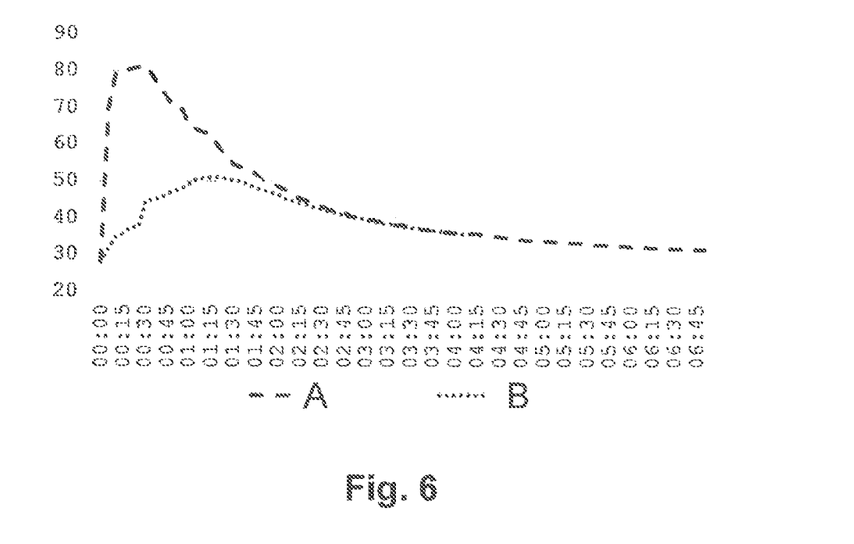
FIG. 6: Exothermic reaction on introduction of the polymer composition compared to liquid pegging.

FIG. 6 shows the temperature curve for a polymer composition (A) according to the invention and a commercial liquid pegging composition (B), measured in the core. The time is plotted in min:sec on the X axis and the temperature is plotted in C on the Y axis.

For the comparison, a two-part mold composed of polyethylene was produced. The mold has a circular hole having a diameter of 10 mm and a depth of 15 mm. The polymer compositions were introduced at room temperature by means of cartridges and the course of the temperature was measured by means of a temperature sensor and plotted. The temperature measurement was carried out at a depth of 4 mm.

The course of the temperature is exothermic for both systems, with the polymer composition according to the invention (A, core 3058_1) displaying a considerably higher core temperature of 80° C. compared to the comparative composition of the liquid pegging composition (B) with a core temperature of 50° C. In addition, this is attained more quickly, i.e. within 15 seconds. The comparative composition attains the maximum core temperature after about 1 min 15 sec.

Thus, better anchoring, for example as a result of partial melting or melting of the intermediate layer composed of thermoplastics, for example in sandwich components having an intermediate layer composed of polystyrene, is achieved in a sandwich component by means of the polymer composition according to the invention. Aluminum sandwich components often have polymer coatings which likewise melt in regions due to the high temperature of the polymer composition and lead to improved anchoring. Furthermore, plastic screws, for example, car, in this way be anchored better in the polymer composition introduced.

Figure 7:
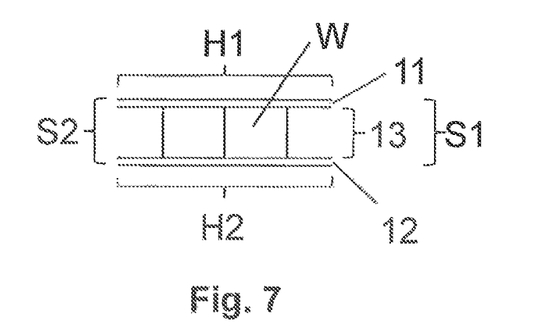
FIG. 7: A side view of a honeycomb plate.

FIG. 7 shows a side view of a honeycomb plate as sandwich component. The honeycomb plate has a main area H1 of a first covering layer 11, a main area H2 of a second covering layer 12 and an intermediate layer 13 which is positioned between the covering layers and has honeycombs W. The main areas H1 and H2 face away from the intermediate layer 13. The side regions S1 and S2 are formed by the covering layers 11 and 12 and the intermediate layer 13. Of course, a sandwich component or a honeycomb plate having rectangular main areas H1, H2 has four side regions.

Figure 8:
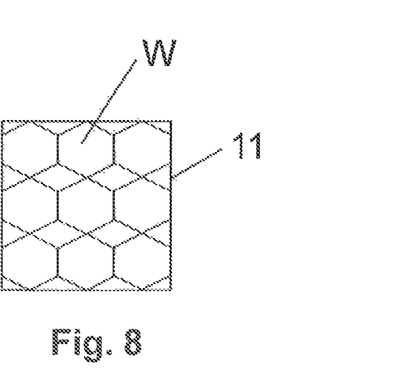
FIG. 8: A plan view of a honeycomb plate without second covering layer.

FIG. 8 shows a plan view of a honeycomb plate as described for FIG. 6, with the second covering layer 12 not being depicted to give a better view. The intermediate layer 13 is formed by the honeycombs W. In the side region of the honeycomb plate, a polymer composition can be introduced by means of the process of the invention.

The invention claimed is:

1. A process for producing a sandwich component having of an insert, which comprises the steps:
providing the sandwich component comprising:
   a first main area having a first covering layer and a second main area having a second covering layer, where at least one of the first covering layer and the second covering layer has an opening, weakening or marking or an opening, weakening or marking is provided in a side region, and
   at least one intermediate layer positioned between the first covering layer and the second covering layer,
introducing a crosslinkable polymer composition at the position of the marking or weakening or through the opening in at least one of the first covering layer, the second covering layer and the side region, into the intermediate layer,
solidifying the polymer composition between the covering layers thereby forming the insert from the solidified polymer composition, and
fixing a mechanical connecting means directly in the solidified polymer composition such that the mechanical connecting means protrudes through and from at least one of the first covering layer, the second covering layer and the side region, in the region of the opening, weakening or marking, wherein the connecting means is selected from the group consisting of a screw, a threaded rod, a clip, a bolt, bushings, sheaths, a spacer, pins, a nail, a hook, a clamp, a spring, rivets, pegs, profiles, brackets, hinges, and magnets.

2. The process as claimed in claim 1, wherein the crosslinkable polymer composition is an adhesive.

3. The process as claimed in claim 1, wherein the crosslinkable polymer composition has a pot life in a range from 1 to 15 seconds, measured in accordance with DIN EN 14022:2010.

4. The process as claimed in claim 1, further comprising joining the sandwich component to a further element, via the connecting means.

* * * * *